UNITED STATES PATENT OFFICE.

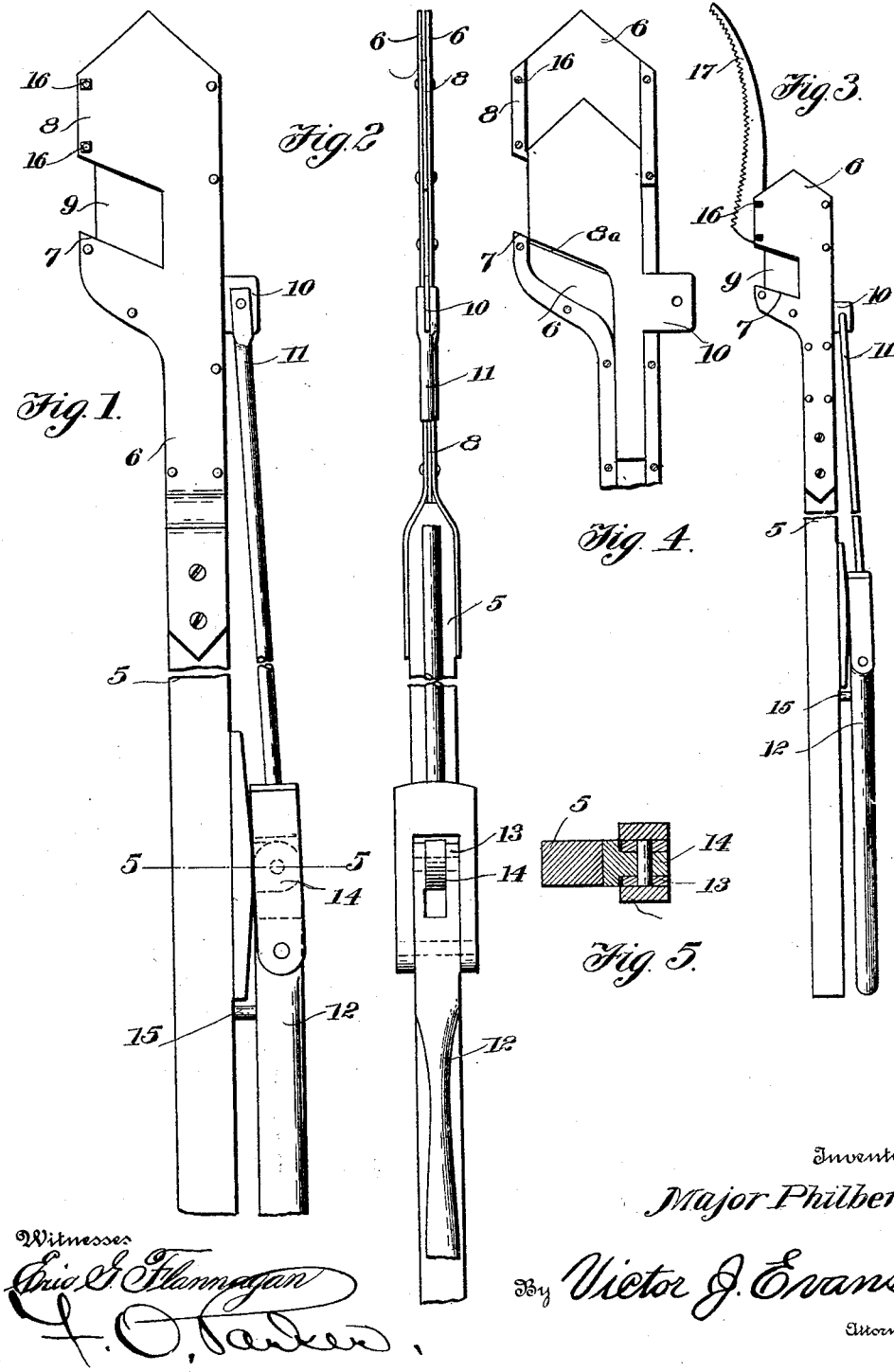

MAJOR PHILBERT, OF WINDSOR, CALIFORNIA, ASSIGNOR OF ONE-HALF TO J. MADISON CAMPBELL, OF SONOMA COUNTY, CALIFORNIA.

COMBINATION-PRUNER.

1,111,672. Specification of Letters Patent. Patented Sept. 22, 1914.

Application filed September 24, 1913. Serial No. 791,625.

*To all whom it may concern:*

Be it known that I, MAJOR PHILBERT, a citizen of the United States, residing at Windsor, in the county of Sonoma and State of California, have invented new and useful Improvements in Combination-Pruners, of which the following is a specification.

The invention relates to pruning implements and more particularly to the class of combination saws and pruning implements.

The primary object of the invention is the provision of an implement of this character wherein the limbs of trees, plants or the like can be cut in a quick and easy manner.

Another object of the invention is the provision of an implement of this character wherein the head of the same is of novel form and is constructed to permit the attachment of a saw blade thereto so that should the limbs be too thick or large to permit the cutting of the same in the usual manner the said limbs can be sawed.

A further object of the invention is the provision of an implement of this character which is extremely simple in construction, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a side elevation of an implement constructed in accordance with the invention. Fig. 2 is an edge view thereof. Fig. 3 is a view similar to Fig. 1, showing the saw blade mounted in the head. Fig. 4 is a fragmentary vertical sectional view through the head. Fig. 5 is a sectional view on the line 5—5 of Fig. 1.

Similar reference characters indicate corresponding parts throughout the several views in the drawing.

Referring to the drawing in detail, the pruning implement comprises a pole or handle 5, which may be of any desirable length and of any shape in cross section, although in this instance the same is of rectangular shape in cross section and is preferably formed from wood. Mounted on one end of the pole or handle 5 is a head which is formed of two pieces of metal 6 riveted or otherwise secured together the said pieces being formed with alining cut away portions which are arranged diagonally to provide a mouth 7, while arranged between the said pieces are spacer strips 8, the same being also engaged by the rivets 6, thus forming a guideway in which works a slidable blade 9 adapted to intersect the opening 7, the said blade being formed with a sharpened edge 8 which coöperates with one wall of the opening 7 for severing limbs of trees. The pieces 6 of the head are suitably fastened to one end of the pole or handle 5. The blade 9 is formed with a wing 10 which extends exteriorly of the head and has pivotally connected thereto a link rod 11 which is also pivoted to an operating lever 12 connected to a pivot 13 which is passed through a bearing 14 mounted upon the pole or handle 5, the latter being provided with a stop lug 15 with which engages the lever to limit its swinging movement in one direction. Carried in the two pieces 6 of the head are a pair of detachable bolt members 16 with which is adapted to be fastened in the head a saw blade 17 which is of the curved type and can be used for sawing tree limbs.

From the foregoing it is thought that the construction and manner of operation of the device will be clearly understood, and therefore a more extended explanation has been omitted.

What is claimed is:—

A pruner comprising a pole, a head formed from two alined plates having cut-away portions diagonally disposed and opening through one side of the head, spacer strips interposed between the pieces and united thereto to form a guideway, a movable blade arranged in the guideway and having a diagonal knife edge working through the cut-away portion in the pieces of the head, one of said spacer strips being cut away to form a guide slot between the pieces of the head, an ear on the blade and projected through the guide slot exteriorly of the head, an operating lever pivotally connected to the pole, and a connecting rod engaged in the ear and attached to the lever for actuating the blade on movement of the latter.

In testimony whereof I affix my signature in presence of two witnesses.

MAJOR PHILBERT.

Witnesses:
F. J. POOL,
O. P. GILLMORE.

Copies of this patent may be obtained for five cents each, by addressing the "Commissioner of Patents, Washington, D. C."